United States Patent [19]

Shiraishi et al.

[11] Patent Number: 5,697,049
[45] Date of Patent: Dec. 9, 1997

[54] RADIO RELAY METHOD, RADIO RELAY SYSTEM USING THE METHOD AND RADIO UNIT

[75] Inventors: Mitsuo Shiraishi, Musashino; Sakari Ohira, Sendai; Fujio Sumi, Tokyo, all of Japan

[73] Assignees: Hitachi Denshi Kabushiki Kaisha, Tokyo; Tohoku Electric Power Co. Inc., Sendai; Fuji-Tekku Kabushiki Kaisha, Tokyo, all of Japan

[21] Appl. No.: 223,976

[22] Filed: Apr. 6, 1994

[30] Foreign Application Priority Data

Apr. 20, 1993 [JP] Japan ................................. 5-115288

[51] Int. Cl.⁶ ....................................... H04B 7/15
[52] U.S. Cl. .......................... 455/11.1; 455/18; 455/72; 455/73
[58] Field of Search .................... 455/11.1, 13.1, 455/15, 16, 18, 72, 73, 78, 79, 34.1, 34.2, 54.1, 89

[56] References Cited

U.S. PATENT DOCUMENTS 5,086,507  2/1992  Mela .................................. 455/34.1

FOREIGN PATENT DOCUMENTS 0498096  8/1992  European Pat. Off. .
0218231  9/1986  Japan ................................ 455/89
WO91/02414  2/1991  WIPO ................................ 455/72

Primary Examiner—Reinhard J. Eisenzopf
Assistant Examiner—Thanh Le
Attorney, Agent, or Firm—Antonelli, Terry, Stout & Kraus, LLP.

[57] ABSTRACT

A radio relay communication system wherein a signal transmitted from active one of a plurality of radio units is received and recorded. When the transmission operation of the particular radio unit stops, the recorded signal is reproduced and transmitted by a relay unit, and another radio unit receives the signal from the relay unit. A relay start signal is transmitted from the first radio unit, and is received by the relay unit. In response to the relay start signal, the relay unit generates a sync signal of predetermined period. The first radio unit, in accordance with the reception of the sync signal, transmits an input signal as compressed to less than one half along the time axis. The relay unit alternates between the period of receiving the compressed signal and the period of transmission in synchronism with the sync signal. The compressed signal transmitted from the relay unit during the transmission period is received by the second radio unit and expanded along the time axis thereby to reproduce the input signal.

3 Claims, 4 Drawing Sheets

RADIO RELAY METHOD, RADIO RELAY SYSTEM USING THE METHOD AND RADIO UNIT

BACKGROUND OF THE INVENTION

The present invention relates to a radio relay method and a radio relay system using the same method and a radio unit in a radio communication system with a press-to-talk radio unit.

The bidirectional communication between radio units outside a communicable area can be effected through a relay station or a relay unit existing in the communicable area.

An example of radio communication through a relay unit is shown in FIG. 4. A radio unit D of press-to-talk type for the remote party is outside a range 100 within the reach of a press-to-talk radio unit C. The press-to-talk radio unit C of the remote party, on the other hand, is located outside the range 200 within the reach of the press-to-talk radio unit D. A relay unit E is present in the range within the reach of the two radio units C and D. In the case where a signal is transmitted to the radio unit D from the radio unit C, the radio unit C sends a signal to a radio relay unit E. The radio unit E receives the signal from the radio unit C and records it. After recording the signal from the radio unit C, the relay unit E reproduces the signal and sends it to the radio unit D.

The transmission of a audio signal message using a conventional radio relay system under the conditions specified in FIG. 4 will be explained with reference to the timing chart of FIG. 5. In FIG. 5((a), (b)), TX (high level) and RX (low level) designate the transmission and receiving conditions of the radio units C, D and the relay unit E. In the case where the radio unit C transmits a message through the relay unit E to the radio unit D, the frequency signal of the tone squelch in the relay unit E is superimposed and transmitted.

The period during which the radio unit C transmits a message is assumed to be T3 and T5. The relay unit E detects that the radio unit C transmits the message by the tone squelch circuit built therein and not shown, and records the message during the periods T3 and T5. Upon completion of message transmission by the radio unit C, i.e., upon completion of the speech, the relay unit E detects the completion of the message by the tone squelch circuit and stops the recording.

Simultaneously with the completion of the message recording, the relay unit E starts reproducing the message that has been recorded, and transmits it for the time length recorded, i.e., the periods T4 and T6. Upon detection of the completion of the message reproduction based on the recording time, the relay unit E stops transmission, and places the recorder (not shown) in a waiting state. In this way, the message transmitted by the radio unit C during the periods T3 and T5 is retransmitted during the periods T4 and T6 by the relay unit E, which message can be received by either the radio unit D or the radio unit C. In similar fashion, the message from the radio unit D is also relayed to the radio unit C.

In the conventional radio relay system, the recording and reproduction of a message at the relay unit E requires the same time length, and therefore it takes twice as long for the signal to travel from the radio unit C to the radio unit D as it takes for the message to be transmitted by the radio unit C. Also, the transmission of a reply from the radio unit D to the radio unit C in response to the message from the radio unit C requires twice the transmission time to the relay unit E. In addition, unless a radio unit completes the transmission, the other radio unit cannot transmit the message. Therefore, a radio unit cannot begin speaking before the message from the other radio unit is completed.

As a result, in the case of relay operation for the communication between radio units, the communication time is increased and the lengthened interval between a message and a reply prevents a smooth conversation. Also, natural conversation as normally conducted on the telephone is impossible.

An example of a radio apparatus of simultaneous transmission/receiving type is disclosed in the specification of WO 91/02414 (international publication dated Feb. 21, 1991) based on the PCT application filed by Tohoku Electric Power Co., Ltd., et al.

SUMMARY OF THE INVENTION

A first object of the invention is to provide a radio relay system and radio relay method, in which the relayed communication is possible at substantially real time.

A second object of the invention is to prevent the signal transmitted from a relay unit from being reproduced by the radio unit that has transmitted the signal.

A radio relay system according to an embodiment of the invention is described. Radio units intended for receiving the service of relay operation are assumed to be a radio unit A and a radio unit B. A relay start signal is transmitted from the radio unit A. The relay unit that has received the relay start signal begins intermittent transmission of a sync signal. When the press-to-talk switch is depressed at the radio unit A that has received the sync signal transmitted by the relay unit, the audio signal inputted via the microphone in synchronism with the sync signal is transmitted by being compressed to less than one half along the time axis. As a result, the transmission time of the radio unit is shortened to less than one half. In the process, the compression ratio is required to be less than one half in order to permit both the radio unite A and B to repeat the transmission and receiving simultaneously. If the compression ratio is just one half, not enough space is available for sending the sync signal, etc., thus the compression ratio must be less than one half. The compression of a signal along the time axis expands the frequency band. Unless the transmission band of the voice signal is limited, a small compression ratio is accepted. In the case where the frequency available for the radio units is legally limited by the national government, the band is subjected to the limiting operation. The smaller the compression ratio, therefore, the lower the sound quality of the original signal. In the case where the frequency band is limited to 3 kHz, for example, the compression ratio is preferably about 1/2.2. The relay units receives the audio signal and record it. During the time space obtained by the signal compression, the relay unit sends a sync signal and the audio signal as reproduced. In the case where the press-to-talk signal is not depressed at the radio unit B, the radio unit B receives the sync signal and the reproduced audio signal transmitted by the relay unit, restores and outputs them on the original time axis.

As a result of the aforementioned operations, a substantially real-time radio relay operation is realized in one wave of radio frequency from the radio unit A to the radio unit B. In the case where the press-to-talk switch of the radio unit B is depressed with that for the radio unit A not depressed, by contrast, a similar radio relay is accomplished from the radio unit B to the radio unit A.

Other objects and advantages of the invention will be made apparent as the description progresses.

DESCRIPTION OF THE PREFERRED EMBODIMENTS

Figure 1:
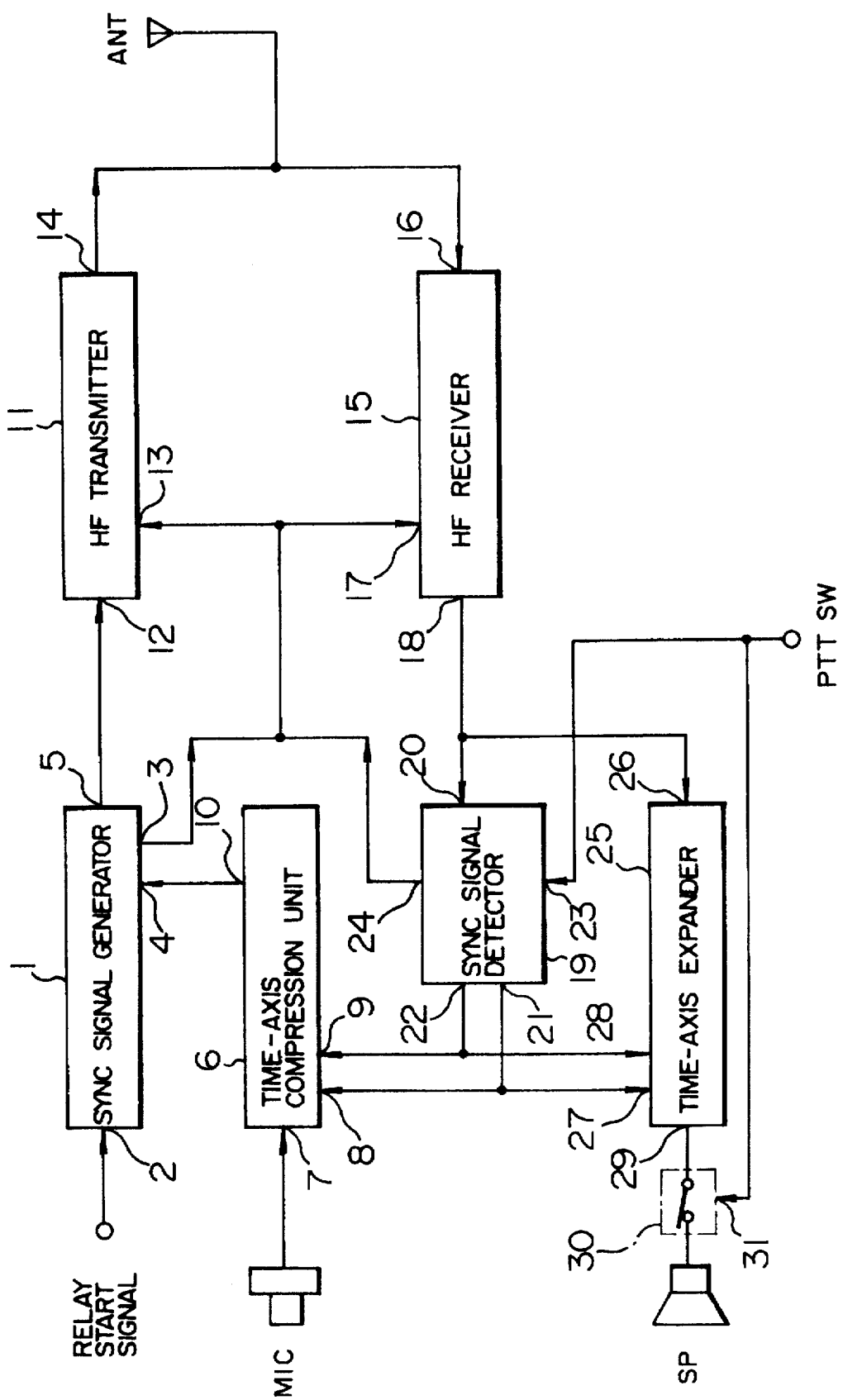
FIG. 1 is a block diagram showing the configuration of a radio unit according to an embodiment of the invention.
Figure 2:
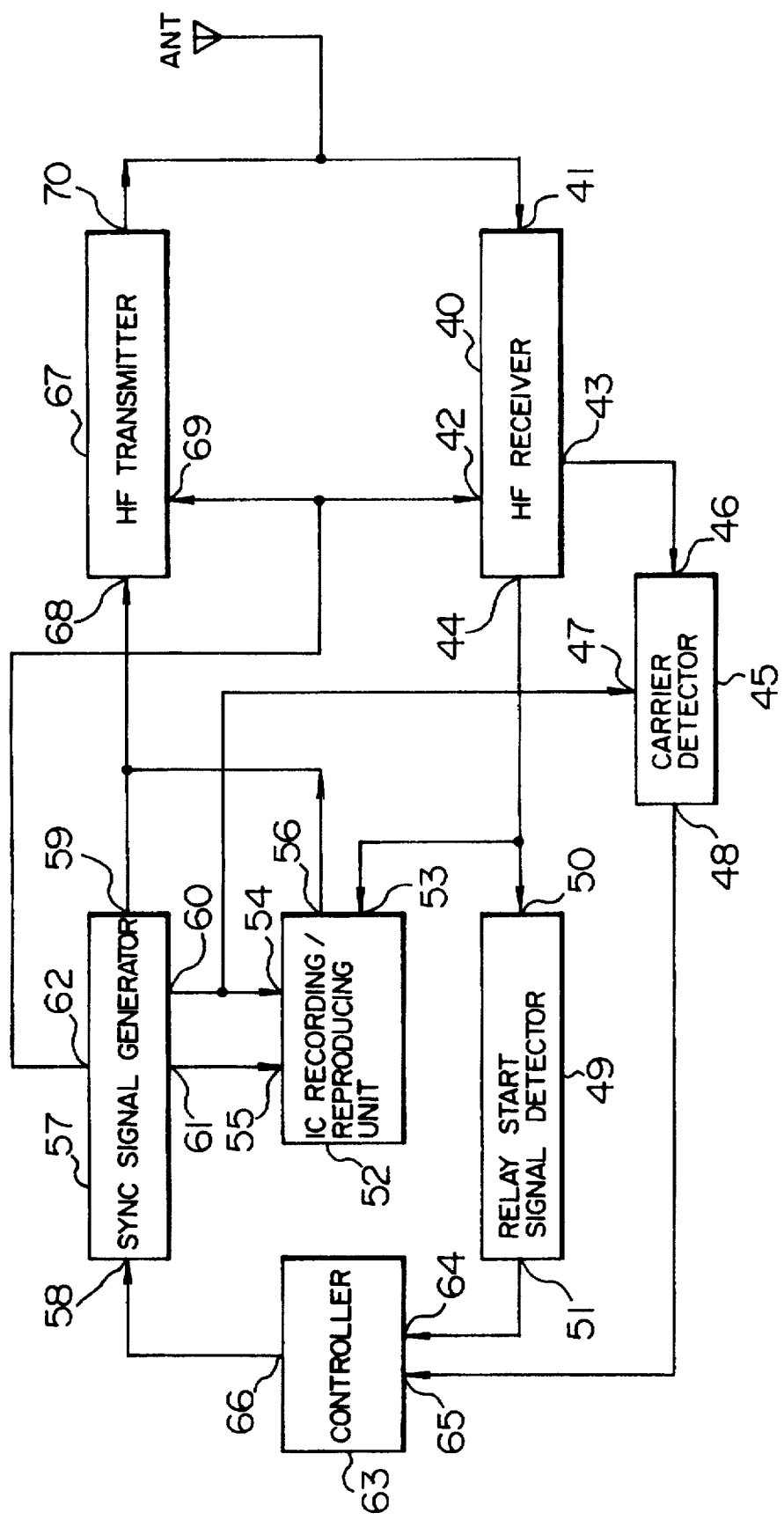
FIG. 2 is a block diagram showing the configuration of a relay unit according to an embodiment of the invention.
Figure 3:
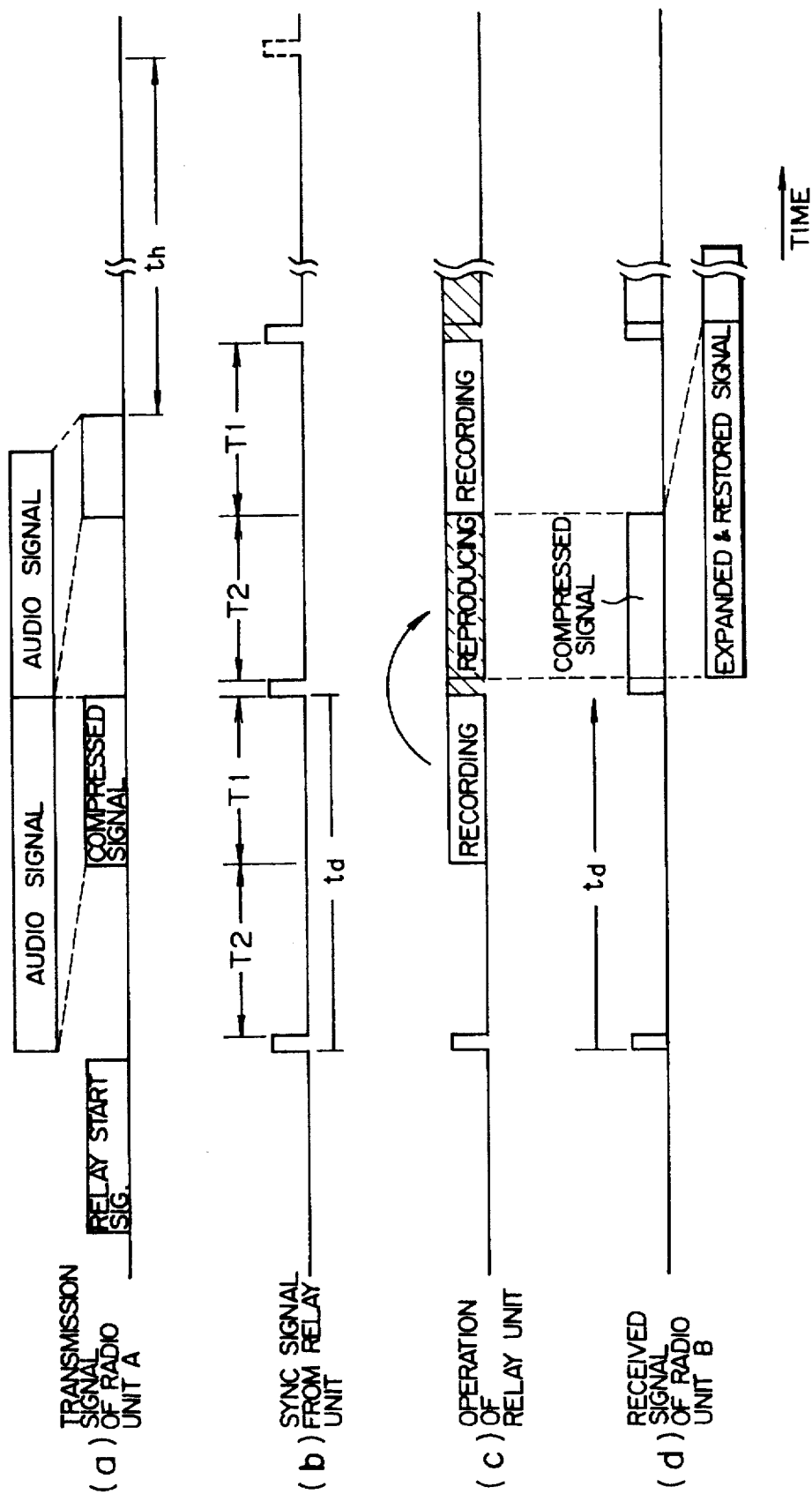
FIG. 3 is a timing diagram for explaining the operation of radio relay operation according to an embodiment of the invention.
Figure 4:
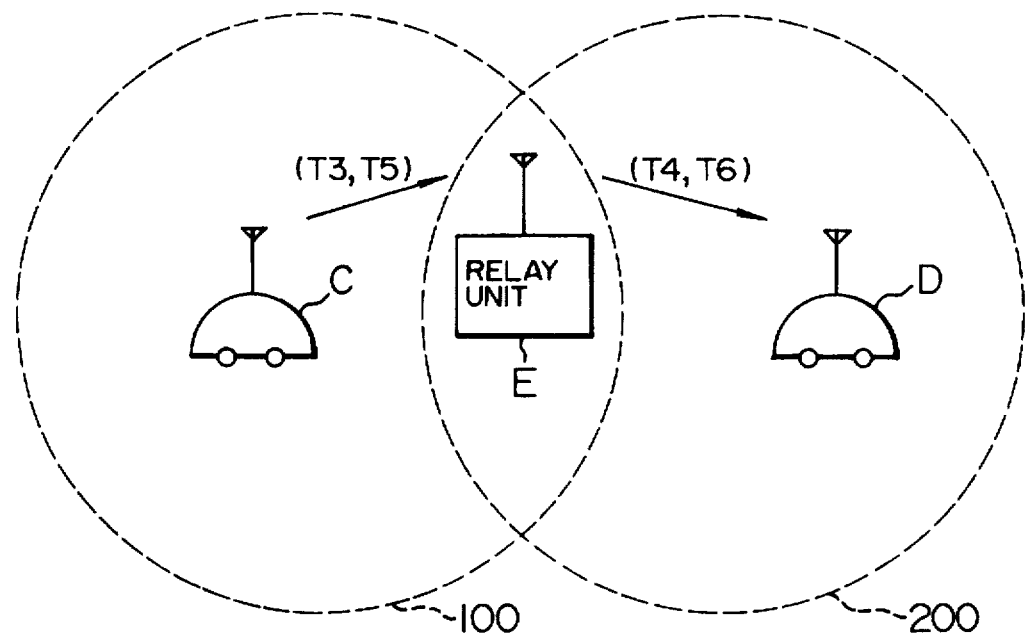
FIG. 4 is a diagram for explaining the radio relaying operation.
Figure 5:
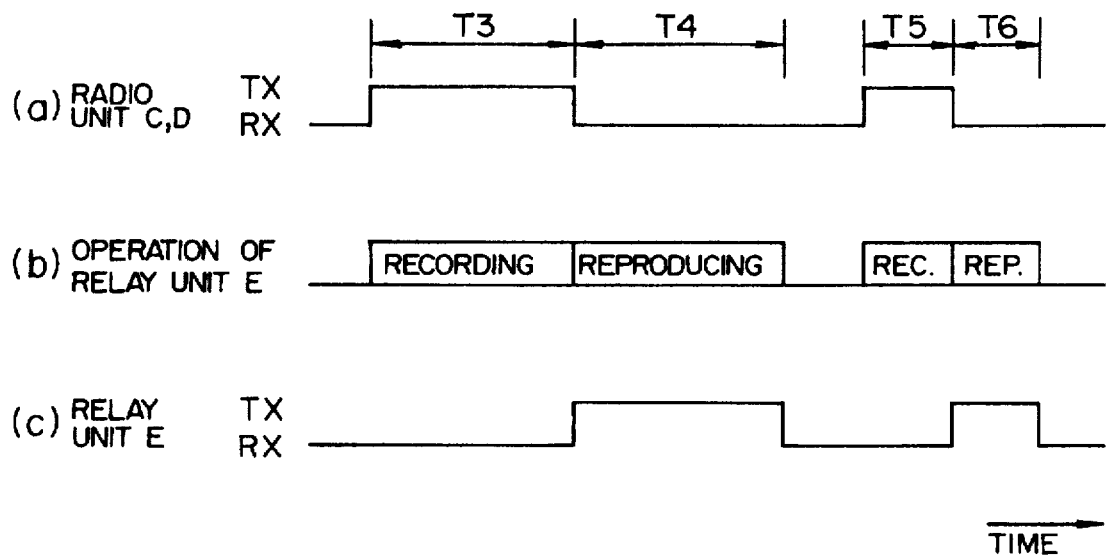
FIG. 5 is a timing diagram for explaining the radio relaying operation according to a conventional method.

A block diagram of a terminal radio unit according to an embodiment of the invention is shown in FIG. 1. This terminal radio unit performs the communication by the relaying operation through a relay unit. The radio units intended for relaying operation are referred to as the radio unit A and the radio unit B (equivalent to the radio units C and D respectively in FIG. 4). FIG. 2 is a block diagram showing a relay unit according to an embodiment of the invention. FIG. 3 is a timing chart for explaining the relaying operation according to an embodiment of the invention.

In the radio unit shown in FIG. 1, a relay start signal generator 1 includes a relay start switch connection terminal 2, a transmission/receiving switching signal output terminal 3 for producing a signal for switching between transmission and receiving, a voice signal input terminal 4, and a modulated signal output terminal 5. The modulated signal output terminal 5 produces the relay start signal while the transmission/receiving switching signal output terminal 3 is set to transmission side, and produces a signal applied from the voice signal input terminal 4 while the transmission/receiving signal output terminal 3 is not set to transmission side.

The FSK (frequency shift keying) signal or DTMF (dual tone multi-frequency) signal is used as the relay start signal. The time-axis compressor 6 includes a microphone input terminal 7, a sync signal input terminal 8, a sync detection signal input terminal 9 and a voice signal output terminal 10. The voice signal output terminal 10 produces the signal input from the microphone input terminal 7 directly when the sync signal is not detected, and compresses the time axis of the signal input from the microphone input terminal 7 to less than one half to produce a signal during a time length T1 following a predetermined period from the sync signal (FIG. 3(b)).

A high-frequency transmitter 11 includes a modulated signal input terminal 12, a transmission/receiving switching signal input terminal 13 and an antenna connection terminal 14. A high-frequency receiver 15 includes an antenna connection terminal 16, a transmission/receiving switching signal input terminal 17 and a demodulated signal output terminal 18.

A sync signal detector 19 includes a demodulated signal input terminal 20, a sync signal output terminal 21, a sync detection signal output terminal 22, a press-to-talk switch input terminal 23 and a transmission/receiving switching sync output terminal 24. When a sync signal is detected, the transmission/receiving switching sync output terminal 24 produces a signal setting a transmission mode during the period T1 as far as a transmission instruction is applied to the terminal 23 from the press-to-talk switch. When a sync signal is not detected, on the other hand, the state applied to the terminal 23 is produced directly.

The transmission/receiving switching signal output terminal 3 and the transmission/receiving switching sync signal output terminal 24, after being ORed (wired-OR), are connected to the transmission/receiving switching signal input terminals 13 and 17. The radio unit is set to the transmission mode when the transmission/receiving switching signal output terminal 3 or the transmission/receiving switching sync output terminal 24 produces an output representing the transmission mode, and enters the receiving mode when both the terminals 3 and 24 produce an output indicating the receiving.

A time-axis expander 25 includes a demodulated signal input terminal 26, a sync signal input terminal 27, a sync detection signal input terminal 28 and a voice signal output terminal 29. The voice signal output terminal 29 directly produces a signal supplied from the demodulated signal input terminal 26 when a sync signal is not detected, and produces a signal input from the demodulated signal input terminal 26 as expanded along the time axis during a predetermined period T immediately following the sync signal when a sync signal is detected.

A voice mute switch 30, which is similar to that used with a conventional radio unit, is operated by a press-to-talk switch input terminal 31 to cut off the voice signal, etc. reproduced from the relay unit in transmission mode.

With the relay unit shown in FIG. 2, a high-frequency receiver 40 includes an antenna connection terminal 41, a transmission/receiving switching signal input terminal 42, a carrier level signal output terminal 43 and a demodulated signal output terminal 44.

A carrier detector 45 includes a carrier level signal input terminal 46, a sync signal input terminal 47, and a carrier detection signal output terminal 48 for detecting the presence or absence of the carrier based on the signal input from the carrier level signal input terminal 46 during the period T1 obtained from the sync signal and producing the same signal.

A relay start signal detector 49 includes a demodulated signal input terminal 50 and a relay start detection signal output terminal 51. An IC (integrated circuit) recording/reproducing section 52 includes a demodulated signal input terminal 53, a recording control input terminal 54, a reproducing control input terminal 55 and a reproducing signal terminal 56. The IC recording/reproducing section 52 records the audio signal input from the demodulated signal input terminal 53 during the period T1, and reproduces and outputs the recorded audio during the period T2.

A sync signal generator 57 includes a sync control input terminal 58, a sync signal output terminal 59, a sync T1 output terminal 60, a sync T2 output terminal 61 and a transmission/receiving switching sync output terminal 62. The transmission/receiving switching sync output terminal 62 sends out a signal for setting the radio relay unit to transmission mode during the sync signal output and the period T2 (hatched in FIG. 3 showing the relay unit operation) only when the sync control input terminal 58 is in transmission mode. The FSK signal or the burst tone is used for the sync signal.

A control section 63 includes a relay start detection signal input terminal 64, a carrier detection signal input terminal 65, and a sync control output terminal 66 for producing a sync control signal to switch the relay unit to transmission mode when the relay start detection signal input terminal 64 enters the detection state and holds the transmission mode during a predetermined length of time th with the carrier not detected by the carrier detection signal input terminal 65.

A high-frequency transmitter 67 includes a modulated signal input terminal 68, a transmission/receiving switching signal input terminal 69 and an antenna connection terminal 70.

The operation of the radio unit will be explained in more detail.

When the distance between radio unit A and radio unit B is within the reach of radio wave from each other, there is no need of relay operation. In such a case, the relay start switch of neither radio unit is depressed, and therefore the relay unit is in a state transmitting no sync signal. Under this condition, the radio unit A detects no sync signal, so that while the press-to-talk switch PTTSW is depressed, the voice signal input from the microphone input terminal 7 is not compressed along the time axis, but is transmitted from the antenna through the relay start signal generator 1 and the high-frequency transmitter 11.

The audio signal from the radio unit B of the remote unit, on the other hand, is also received by the antenna and demodulated by the high-frequency receiver 15. The audio signal produced at the demodulated output terminal 18 is expanded along the time axis at the time axis expander 25, so that an audio signal similar to the one for the conventional radio unit is produced at the audio signal output terminal 29. While the press-to-talk switch PTTSW is not depressed, the radio unit A is capable of receiving the message from the radio unit B. As a result, the press-to-talk communication is maintained directly between radio units A and B but not through the relay unit.

Now, the relay operation will be explained.

When direct press-to-talk operation becomes difficult as the distance increases between radio units A and B, communication is maintained by means of a relay unit. In that case, the operator depresses the relay start switch SW of the radio unit A, for example. A relay start signal is generated, and applied to the modulated signal input terminal 12. The transmission/receiving switching signal output terminal 3 sends out a transmission signal, and the high-frequency transmitter 11 transmits a relay start signal. The relay unit detects this signal, and as shown in FIG. 3(b), begins to send out the sync signal at regular compression intervals of td (about 0.4 seconds). This period td of about 0.4 seconds is sufficiently short as compared with the length of a single message.

Upon depression of the press-talk switch PTTSW of radio unit A receiving the sync signal, the audio signal of the period td input from the microphone input terminal 7 is compressed at a predetermined ratio, for example, to less than one half along the time axis during the period T1 at the time-axis compressor 6, is applied to the high-frequency transmitter 11 through the relay start signal generator 11, and is transmitted from the antenna. This operation is repeated by the radio unit A while the same sync signal is received with the press-to-talk switch kept depressed. In other words, a message is divided and transmitted in a plurality of signals (FIG. 3(a)).

Due to this time-axis compression, the frequency component of the audio signal is exceeds twice the original frequency component. In the case where the maximum transmittable frequency is limited by the law governing the radio wave, however, the signal exceeding the critical band is removed by the high-frequency transmitter 11. In other words, the frequency is limited to the band less than 3 kHz for the domestic use in Japan for example.

The relay unit that has received the audio signal compressed during the period T1 records the same signal, and reproduces and transmits it during the period T2 (FIG. 3c). The remote radio unit B that has detected the sync signal receives the compressed audio signal transmitted from the relay unit during the period T2 (FIG. 3d), which signal is demodulated at the high-frequency receiver, expanded along the time axis by the time-axis expander and can thus be received as a normal audio signal. (The playback circuit of the radio unit B, which is identical to that for the radio unit A (shown in FIG. 1), is not shown.)

As described above, the high-frequency component of the voice signal is removed at the high-frequency transmitter 11. The time required (delay time) for message delivery is shortened to the compression period td, thereby permitting substantially real-time communication with the remote unit through the relay unit.

When both the radio units A and B release the press-to-talk switch and thus stop transmission, the relay unit detects the fact at the carrier detector 45, and after the lapse of a predetermined time th (set to 2 to 10 seconds) stops sending out the sync signal. As a consequence, the radio units A and B become unable to receive the sync signal and return to the initial condition.

The operations described above lead to a subsidiary effect of shortening the maximum recording time of the IC recording/reproducing section of the relay unit, thereby eliminating the need of controlling the recording/reproducing time changing with each speech.

According to the embodiment under consideration, when the press-to-talk switch PTTSW is set to receiving mode at a radio unit, the signal transmitted by itself may be received. As a countermeasure against this inconvenience, the audio signal is muted by the time-axis expander 25 during the period from switching the press-to-talk switch to the receiving mode by the sync signal detector 19 to the next sync signal. Also, several relay start switches are provided for transmitting different relay start signals, whereby an appropriate relay unit can be selected from among a plurality of radio units which may be available. Further, in the embodiment under consideration, it is easily surmised that the carrier detector 45 of the relay unit can use a squelch signal instead of the carrier level signal for the FM radio unit.

It will thus be understood from the foregoing description that according to the invention, when a relay unit is used, a relay start signal is transmitted to cause a sync signal to be transmitted periodically from the relay unit, and a radio unit transmits a signal compressed to less than one half along the time axis in synchronism with the sync signal, so that the receiving unit receives the signal expanded to the original value along the time axis. As a result, the conversation time is shortened, the conversation progresses smoothly, and the messages can be relayed substantially real time.

We claim:

1. A relay method for radio communication system which includes a first radio unit, a relay unit for receiving, recording and transmitting signals transmitted from said first radio unit through a transmission path, and a second radio unit for receiving said signals transmitted from said relay unit through said transmission path, said transmission path transmitting periodic sync signals having a first period and a second period supplied to said first and second radio units from said relay unit so that said first and second radio units operate synchronously with each other, said signals from said first radio unit being transmitted to said second radio unit through said relay unit by one wave of radio frequency, said relay method comprising the steps of:

dividing a voice signal into a plurality of signal portions in accordance with said periodic sync signals at said first radio unit;

compressing each of said signal portions to less than one half along a time axis in accordance with said periodic sync signals at said first radio unit;

transmitting compressed signal portions from said first radio unit in said first period of said periodic sync signals to said relay unit;

receiving said compressed signal portions intermittently at said relay unit;

recording each of the received compressed signal portions during said first period of said periodic sync signals at said relay unit;

reproducing each of the recorded compressed signal portions during said second period of said periodic sync signals at said relay unit;

transmitting the reproduced compressed signal portions intermittently during said second period of said periodic sync signals at said relay unit;

receiving the transmitted signals from said relay unit during said second period of said periodic sync signals at second radio unit; and expanding the received signals in accordance with said periodic sync signals, and reproducing the original voice signal at said second radio unit.

2. A relay method for a radio communication system which includes a first radio unit, a relay unit for receiving, recording and transmitting signals which are transmitted from said first radio unit, and a second radio unit for receiving signals transmitted from said relay unit, said signals from said first radio unit being transmitted to said second radio unit through said relay unit by one wave of radio frequency, said relay method comprising the steps of:

transmitting a predetermined relay start signal from said first radio unit to said relay unit, when said first radio unit starts a relay communication;

receiving and detecting said predetermined relay start signal at said relay unit;

generating and transmitting periodic sync signals which have a predetermined period (td) at said relay unit after detecting said predetermined relay start signal;

receiving said periodic sync signals at said first and second radio units;

dividing a voice signal into a plurality of divided voice signals by said predetermined period (td) at said first radio unit, when said periodic sync signals are detected;

compressing each of said divided voice signals to less than one half said predetermined period (td) along the time axis in accordance with said periodic sync signals at said first radio unit;

transmitting compressed voice signals intermittently from said first radio unit to said relay unit;

receiving said compressed voice signals intermittently at said relay unit;

recording each of the received compressed voice signals during a first half period (T1) of said predetermined period (td) in accordance with the transmission timing of said periodic sync signals at said relay unit;

reproducing each of the recorded compressed voice signals during a second half period (T2) of said predetermined period (td) in accordance with the transmission timing of said periodic sync signals at said relay unit;

transmitting the reproduced compressed voice signals intermittently during said second half period (T2) of said predetermined period (td) at said relay unit;

receiving the transmitted signals intermittently from said relay unit at said second radio unit; and expanding the received signals in accordance with said periodic sync signals, and reproducing the original voice signal at said second radio unit.

3. A relay method according to claim 2, further comprising the step of:

stopping reproduction of a voice signal at said first radio unit while said compressed voice signals are transmitted intermittently from said relay unit to said second radio unit.

* * * * *